(12) United States Patent
Curfew

(10) Patent No.: US 10,594,008 B2
(45) Date of Patent: Mar. 17, 2020

(54) ELECTROCHEMICAL CELL

(71) Applicant: Dan Curfew, Evansville, WY (US)

(72) Inventor: Dan Curfew, Evansville, WY (US)

( * ) Notice: Subject to any disclaimer, the term of this patent is extended or adjusted under 35 U.S.C. 154(b) by 356 days.

(21) Appl. No.: 15/224,400

(22) Filed: Jul. 29, 2016

(65) Prior Publication Data

US 2017/0033421 A1 Feb. 2, 2017

Related U.S. Application Data

(60) Provisional application No. 62/199,814, filed on Jul. 31, 2015.

(51) Int. Cl.
| | |
|---|---|
| *H01M 12/06* | (2006.01) |
| *H01M 2/20* | (2006.01) |
| *H01M 2/10* | (2006.01) |
| *H01M 12/02* | (2006.01) |

(52) U.S. Cl.
CPC ......... *H01M 12/06* (2013.01); *H01M 2/1016* (2013.01); *H01M 2/202* (2013.01); *H01M 12/02* (2013.01); *H01M 2300/0002* (2013.01)

(58) Field of Classification Search
CPC .............................. H01M 12/06; H01M 12/08
See application file for complete search history.

(56) References Cited

U.S. PATENT DOCUMENTS

| | | | |
|---|---|---|---|
| 3,536,536 A | 10/1970 | Lucas | |
| 4,842,963 A | 6/1989 | Ross, Jr. | |
| 5,445,901 A | 8/1995 | Korall et al. | |
| 6,312,844 B1* | 11/2001 | Faris | H01M 4/42 429/404 |
| 7,247,254 B1 | 7/2007 | Flowers | |
| 2001/0023036 A1* | 9/2001 | Faris | B60L 11/1883 429/404 |
| 2002/0132158 A1 | 9/2002 | Sassen | |
| 2004/0005488 A1 | 1/2004 | Faris et al. | |
| 2007/0141462 A1 | 6/2007 | Wang et al. | |
| 2007/0298305 A1 | 12/2007 | Van Burdine | |
| 2010/0119919 A1* | 5/2010 | Iarochenko | H01M 2/0207 429/405 |
| 2012/0021303 A1 | 1/2012 | Amendola et al. | |
| 2012/0178001 A1* | 7/2012 | Zhang | H01M 4/133 429/405 |
| 2013/0001774 A1 | 1/2013 | Masumori et al. | |
| 2013/0052547 A1 | 2/2013 | Ogino et al. | |
| 2013/0065143 A1 | 3/2013 | Knepple et al. | |
| 2015/0147675 A1* | 5/2015 | Oi | H01M 8/0206 429/481 |

FOREIGN PATENT DOCUMENTS

| | | | |
|---|---|---|---|
| WO | WO 2013137026 | * | 9/2013 |
| WO | WO2013161971 | * | 10/2013 |

OTHER PUBLICATIONS

International Search Report, corresponding to PCT/US2016/044901, dated Nov. 15, 2016, 3 pages.

* cited by examiner

*Primary Examiner* — Olatunji A Godo
(74) *Attorney, Agent, or Firm* — Fennemore Craig, P.C.

(57) ABSTRACT

An air-metal battery utilizes a magnesium anode, a carbon cathode, and a conductive fluid including glycol and water. The anode and cathode are provided in a fuel card assembly that is replaceable as a unit.

8 Claims, 6 Drawing Sheets

ELECTROCHEMICAL CELL

CROSS-REFERENCE TO RELATED APPLICATIONS

This application claims the benefit of priority of U.S. Application No. 62/199,814 filed Jul. 31, 2015, the content of which is incorporated herein by reference in its entirety.

BACKGROUND

Field

The present disclosure is related to the field of electrochemical cells and, in particular, air-metal batteries. This is a class of battery that generates electrical energy from metal-oxygen reaction.

Description of the Related Art

Air metal batteries typically have a cathode or air electrode that operates to reduce oxygen molecules, and an anode that contains an alkali metal to oxidize the alkali metal. The cathode is frequently carbon. Lithium batteries are one type of air-metal battery. A reaction according to Equation (1) proceeds at the negative electrode or anode during discharge.

$$2Li \rightarrow 2Li+ + 2e- \qquad (1)$$

The reaction generates that are output to an external circuit or load, where they perform work while they transit to the cathode, which is also called the air electrode. Lithium ions (Li+ in the above formula) migrate by electroosmosis through an electrolyte that is retained between the negative electrode and the air electrode. The migration occurs from the anode side to the air electrode side. Reactions of the following Equations (2) and (3) proceed at the air electrode during discharge.

$$2Li+ + O_2 + 2e- \rightarrow Li_2O_2 \qquad (2)$$

$$2Li+ + \tfrac{1}{2}O_2 + 2e- \rightarrow Li_2O \qquad (3)$$

The lithium peroxide ($Li_2O_2$) and lithium oxide ($LiO_2$) accumulate on the air electrode as a solid. During charging, the reverse reaction of formula (I) proceeds at the negative electrode, while the reverse reactions of formulas (II) and (III) proceed at the air electrode. This regenerates metal lithium at the anode. It is not necessary that the battery is constructed in a regenerable manner. U.S. Pat. No. 9,048,511 describes a number of batteries that work off of this general theme. Metals for use in the air electrode may include, for example, Mg, Mn, Fe, Co, Ni, Cu Zn, Al, Cr, Fe, and Co.

According to U.S. Pat. No. 8,974,927 issued to Fertman, the air metal battery may utilize seawater or an electrode as the electrolyte, and the metal of the anode may be magnesium. Thus, magnesium is dissolved from the anode according to Equation (4):

$$2Mg = 2Mg_2+ + 4e- \qquad (4)$$

Oxygen is consumed at the cathode according to Equation (5):

$$O_2 + 2H_2O + 4e- = 4OH- \qquad (5)$$

These reactions provide a discharge from the cell where current density is relatively low at about 1 W/m² when seawater is used as the electrolyte. Hydrogen gas forms at the magnesium surface and may be collected for use.

One problem with air-metal batteries is that the metal, particularly at the anode, tends to degrade structurally with use. In the case of a non-rechargeable battery, this means that electrical generation capacity is also degraded where the metal becomes unavailable for conversion. In rechargeable batteries, this degradation limits the number of recharge cycles that can be suitably performed. This problem is similar in nature to anode degradation by the corrosive action of salts or bases that are provided in the electrically conductive fluid through which electrons migrate for reactions at the electrodes.

SUMMARY

The presently disclosed instrumentalities overcome the problems outlined above an advance the art by improving the structure of air-metal batteries.

In one aspect, an air-metal battery has an electrically conductive fluid communicating electrons between an anode and a cathode. This structure is improved by providing a fuel card assembly that is replaceable as a unit.

In one aspect, the electrically conductive fluid is dominantly a polyhydric liquid, which mitigates corrosion during system storage. In a preferred sense, the polyhydric liquid is primarily, or dominantly in terms of volume percent composition, a glycol and more preferably propylene glycol. The glycol may be mixed with a lesser amount of water to provide a glycol and water mixture. This is done to increase conductivity of the glycol, for example, by including at least a 10%, 20% 30%, 40% or 50% v/v constituent of water. The remainder may be the glycol or a mixture of polyhydric alcohols.

In one aspect, the fuel card assembly includes a sandwich construction with remote sides of a metal plate each sandwiched by a pair of wicking pads and then a pair of cathodes. The pair of cathodes may be made of a conductive form of carbon, such as carbon that is mixed with a conductive synthetic resin.

In one aspect, the air-metal battery has a housing that is arranged in two banks with each bank constituting a plurality of electrochemical cells. A rail system connects the cells of a bank in electrical series. Alternatively, the rail system may connect the cells in parallel.

Air-metal batteries of the type disclosed may have a shelf-life of at least five years or more under conditions of static storage with no applied load. Alternatively, the storage life may be extended for any amount of time by the expedient of storing the electrically conductive fluid separately outside the confines of the battery housing.

According to some embodiments, magnesium metal is a particularly preferred anodic metal.

DETAILED DESCRIPTION

Figures 1, 1A:
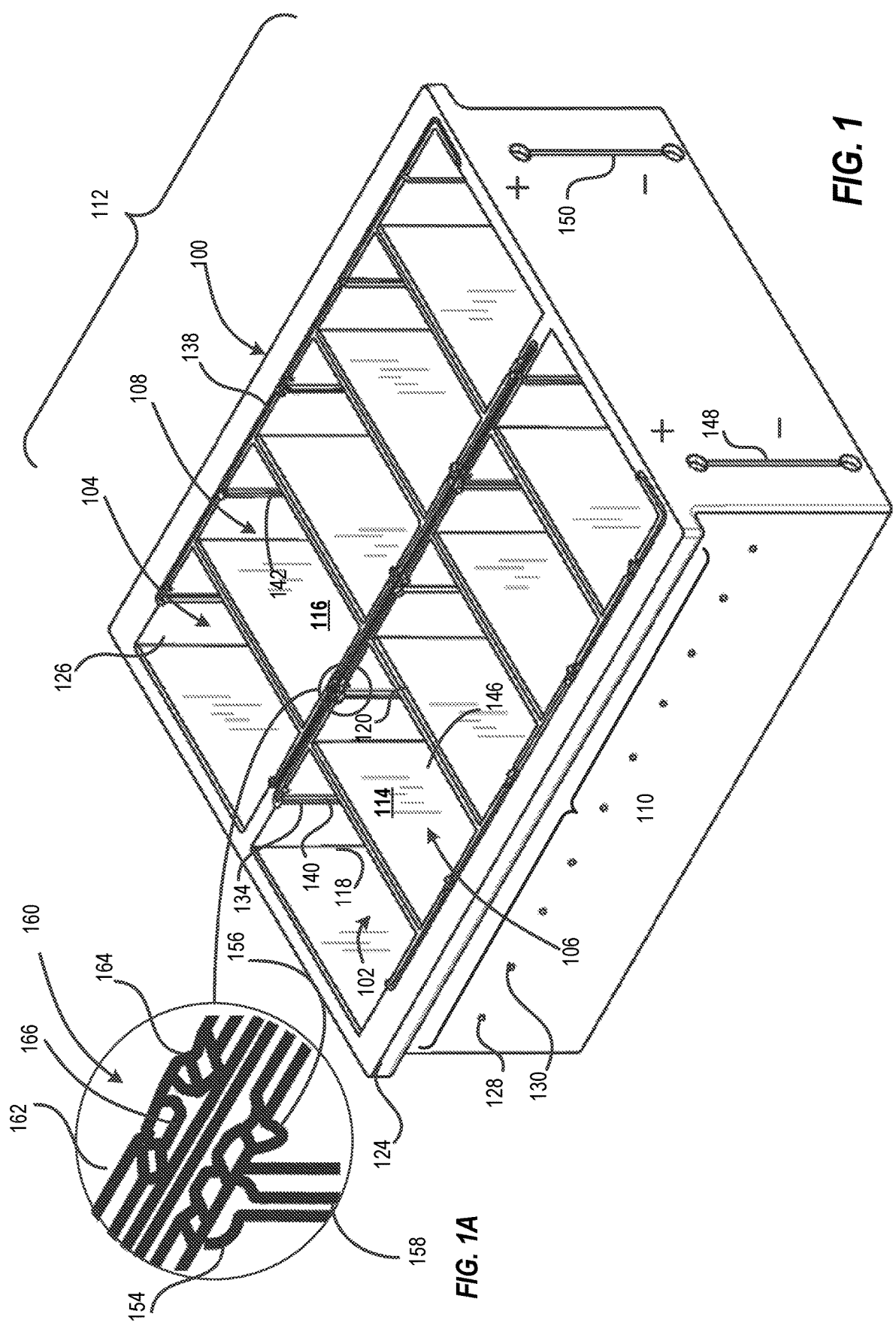
FIG. 1 shows a partial housing for use in the air-metal battery, where
FIG. 1A is expanded to provide additional detail with respect to FIG. 1.

The presently disclosed instrumentalities are shown by way of example, and not by way of limitation. FIG. 1 shows a midportion of housing 100 for an air-metal battery. Housing 100 is preferably made of a strong, lightweight material such as a plastic having a low dielectric constant, i.e., a good insulator. Polyethylene or polypropylene plastics are particularly preferred. Among other such materials, a ceramic material may also be utilized. Housing 100 includes a plurality of electrochemical cells, such as cells 102, 104, 106, 108. Altogether there are ten such cells organized into a first bank 110 of five cells including, among others, the cells 102 and 106, and a second bank 112 of five cells including the cells 104, 108. As shown, the first and second banks run longitudinally with the elongate axis of housing 100, but it is also possible to have laterally running banks where, for example, cells 102, 104 may constitute a bank and cells 106, 108 may constitute another bank.

As shown in FIG. 1, lateral partition walls isolate the adjacent cells of each bank from one another, such as lateral partition wall 114 isolates cell 102 from cell 104 in the first bank 110. In the same manner, lateral partition wall 116 isolates cell 104 from cell 108 in the second bank 112. Longitudinal partition walls separate adjacent cells from bank-to-bank, for example, as longitudinal partition wall 118 separates cell 102 of the first bank 110 from cell 104 of the second bank 112.

Exterior features of housing 100 include a circumferential sidewall 122 atop which sit outwardly extending ridges 124, 126 that run in parallel with the lateral partition walls 118, 120. Housing 100 also includes a bottom and a lid, which are not shown in FIG. 1, but which provide an enclosure for each of cells 102, 104, 106, 108. Air holes, such as air hole 126 allocated to cell 102 and air hole 130 allocated to cell 106, permit the egress of oxygen into the respective cells and the venting of hydrogen as may be generated from within the cells.

An electrical rail system includes upper rail members 132, 134, 136, 138, which reside within slots formed within housing 100 to form gathering systems for electrical current that is generated from with the cells 102, 104, 106, 108. Feeder members within each cell, such as feeder members 140, 142, feed corresponding rail members such as rail members 134 (feeder 140) and 136 (feeder 142). It will be appreciated that the rails 132, 138 are in electrical communication with corresponding slotted openings 148, 150. The slotted openings 148, 150 are provided for connections to the positive and negative terminals of the battery. Thus, slotted opening 148 is provided with a positive terminal + and a negative terminal − in electrical communication with rails 132, 134 of bank 110. Rail 132 feeds the + terminal of slotted opening 148 and rail 134 feeds the − terminal. Likewise, slotted opening 150 is provided with a positive terminal + and a negative terminal − in electrical communication with rails 136, 138 of bank 112. The slotted openings 148, 150 may be sealed with compression fittings (not shown) or gaskets that are placed in compression by threaded fasteners constituting the respective + and − terminals.

Figure 2:
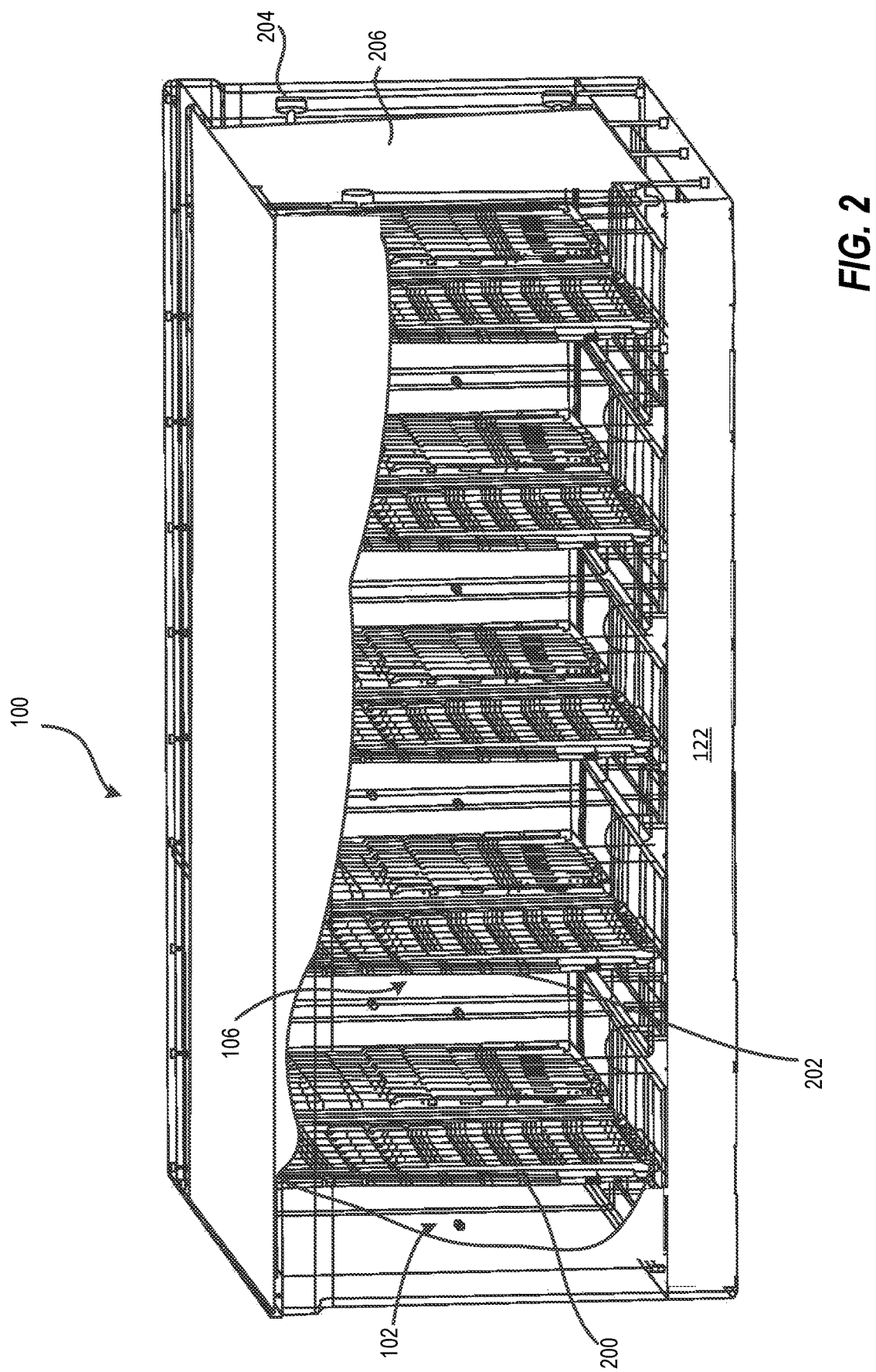
FIG. 2 shows the housing of FIG. 1 in complete form with a sidewall partially removed to reveal interior details concerning installation of replaceable fuel card assemblies.

FIG. 2 shows a fully assembled version of housing 100. Each cell, such as cells 102, 106, contains a fuel card assembly 200, 202 that is in electrical communication with the rails, such as rails 132, 134 (see FIG. 1). The fuel card assemblies provide the electrochemical reactions described above for generation of electricity, as commences when voids, such as voids 144 for cell 102 and 146 for cell 106 (see FIG. 1), are filled with a conductive solution. Any conductive solution may be utilized where this may be, for example, An electrolyte or salt solution such as seawater, or an alkaline solution as is known to the art. Departing from uses known in the art, use of a low volatility polyhydric alcohol is preferred. This may be, for example, a glycol such as ethylene glycol or propylene glycol. Propylene glycol is particularly preferred. The polyhydric alcohol material permits the aforementioned reactions but, unlike electrolyte solutions of the prior art, is prevents the formation of dendrites that, otherwise, may grow and short out the fuel cards leading to substantially less than 100% conversion of the anodic metal. By comparison, the use of glycol facilitates approximately 100% conversion of the anodic metal, such as by a 97%, 98%, 99% or 100% conversion in reactions according the discussion of Equations (4 and (5), supra. The electrochemical reactions proceed very slowly over time until terminals 204, 206 are connected to an electrical load. The terminals 204, 206 form respective positive and negative leads that are respectively connected to rail 132 in the case of terminal 204 (positive) and rail 138 in case of terminal 206 (negative). As is also described above, the terminals 204, 206 are provided as threaded fasteners forming part of compression fittings (not shown) that seal the slotted openings 148, 150.

Figure 3:
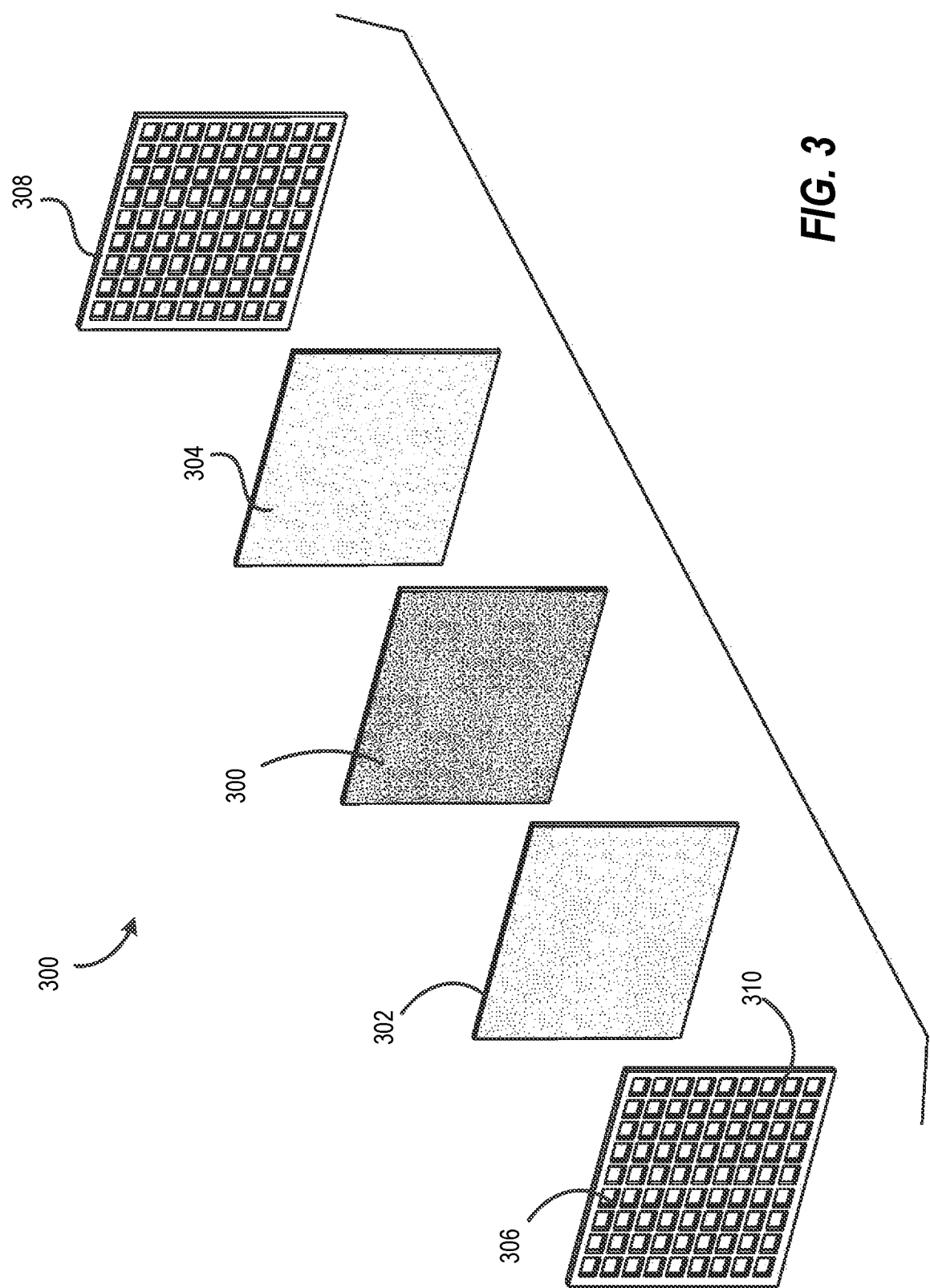
FIG. 3 provides an assembly view of a replaceable fuel card assembly.

FIG. 3 shows the components of fuel card assembly 202 as an example of fuel card assembly structure. A metal plate 300 is at the center of fuel card assembly 202. The metal may be any metal useful for air-metal batteries, such as Al, Ge, Ca, Fe, Li, Mg, K, Na, Si, Sn, Zn, or an alloy of these metals in any combination. Li is preferred for rechargeable applications and Mg is preferred for nonrechargeable applications. Wicking pads 302, 304 function to distribute conductive fluid to the plate 300. The distribution mechanism of wicking is useful in reducing the overall size of housing 100 where, as shown in FIG. 1, the internal conductive fluid cannot reside at a positon above air holes 128, 130. Grids 306, 308 lend support to wicking pads 302, 304 by providing pressure assuring contact with plate 300. The grids 306, 308 each have a matrix of perforations providing a fluidic pathway for electrolyte liquid and oxygen to reach plate 300. The grids 306, 308 form cathodes for the chemical reactions discussed supra, while the plate 300 forms the anode. The grids 306, 308 may be, for example, a laminate that supports a carbon outer shell, such as carbon over metal or carbon over fiberglass. In another aspect, the carbon may be provided, for example, as a synthetic resin that is co-extruded or otherwise intermixed with charcoal or graphite and/or metal particles in sufficient amounts to form a conductive cathode.

It will be appreciated that the electrochemical reactions utilized to generate electricity will consume the metal content of the fuel cards 202; however, the attributes of electricity production are surprisingly linear or consistent as this consumption is underway. The fuel cards 202 may be replaced as individual units and the electrolyte replaced from time to time as needed. Use of the disclosed structure advantageously results in substantially complete consumption of the metal in the fuel card assembly 202 when used in combination with the polyhydric or glycol material discussed above, particularly since this prevents the formation of dendrites that, otherwise, may short out the card assembly to result in incomplete consumption of metal.

The disclosed structure provides a particularly dense form of electricity production. For example, the housing 100 may be scaled to provide a 100 pound (45 kg) structure capable of producing 7 Mega Watts. A 200 pound (91 kg) structure may provide 15 Mega Watts. The units may be connected to provide this in voltages from 1.5 V to 6, 12, 24 or 48 V. Even considering the cost of replacing cards 202 with renewal of the electrolyte, the cost of generating this electricity is comparably less expensive than electricity generated at this scale by use of a generator or alternator driven by an internal combustion engine.

Table 1, which is provided below, provides theoretical specific energies and open circuit voltages for the different battery types based upon selection of metal for plate 300. It will be appreciated that the conductive fluid must be selected with care where, for example, contact between sodium metal and water may cause an explosion.

Table: Air-Metal Battery Characteristics:

| Metal-air battery | Theoretical specific energy, Wh/kg (including oxygen) | Theoretical specific energy, Wh/kg (excluding oxygen) | Calculated open-circuit voltage, V |
|---|---|---|---|
| Aluminum-air | 4300 | 8140 | 1.2 |
| Germanium-air | 1480 | 7850 | 1 |
| Calcium-air | 2990 | 4180 | 3.12 |
| Iron-air | 1870 | 14730 | 1.3 |
| Lithium-air | 5210 | 11140 | 2.91 |
| Magnesium-air | 2789 | 6462 | 2.93 |
| Potassium-air | 935 | 1700 | 2.48 |
| Sodium-air | 1677 | 2260 | 2.3 |
| Silicon-air | 6110 | 14230 | 1.6 |
| Tin-air at 1000K | 860 | 6250 | 0.95 |
| Zinc-air | 1090 | 1350 | 1.65 |

The rail members 132-138 may be constructed and arranged to provide the serial or parallel connections described above. As shown in FIG. 1, the banks 110, 112 are each formed of five cells connected in series connection is in series. Each bank produces about 15V in the case of a magnesium battery, which equates to 2.93 V per cell times five cells. External voltage can be increased using, for example, a boost converter or other circuitry known to the art for this purpose. This is accomplished by providing the feeder members, such as feeder members 140, 142, rails with electrical contact that also retain the fuel card assembly in place. FIG. 1A shows an anode contact 152 with a metal "L" 158 extending for contact with plate 300 of the fuel card assembly (see FIG. 3) and nonconductive (plastic) spring members 154, 156, which provide bias urging grid members 306, 308 and wicking pads 302, 304 into plate 300. The "L" 158 may be made of any metal having a lower standard oxidation potential than that of metal plate 300. Through "L" 158, the anode contact 152 provides electrons to rail 134 according to Equation (4), supra. As is also shown in FIG. 1A, a cathode contact 160 that includes conductive (metal) spring members 162, 164 in opposition across channel 166. A fuel card assembly, such as fuel card assembly 300, resides in the channel 166 while the spring members 162, 164 are electrical communication with grid members 306, 308 and rail 136. This provides for conduct of the reaction according to Equation (5), supra, at grid members 306, 308.

Figure 4:
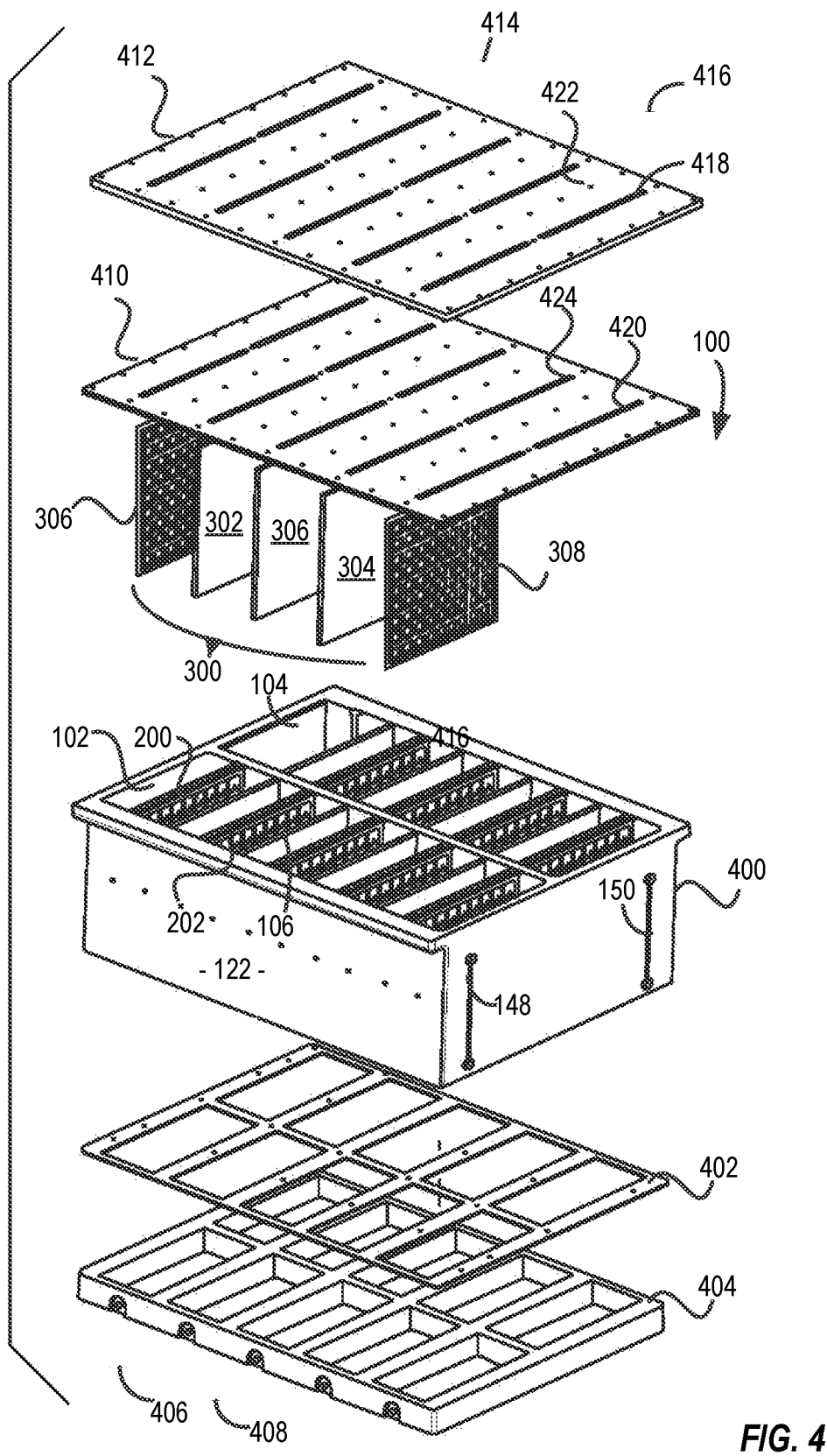
FIG. 4 provides an assembly view of the housing.
Figure 5:
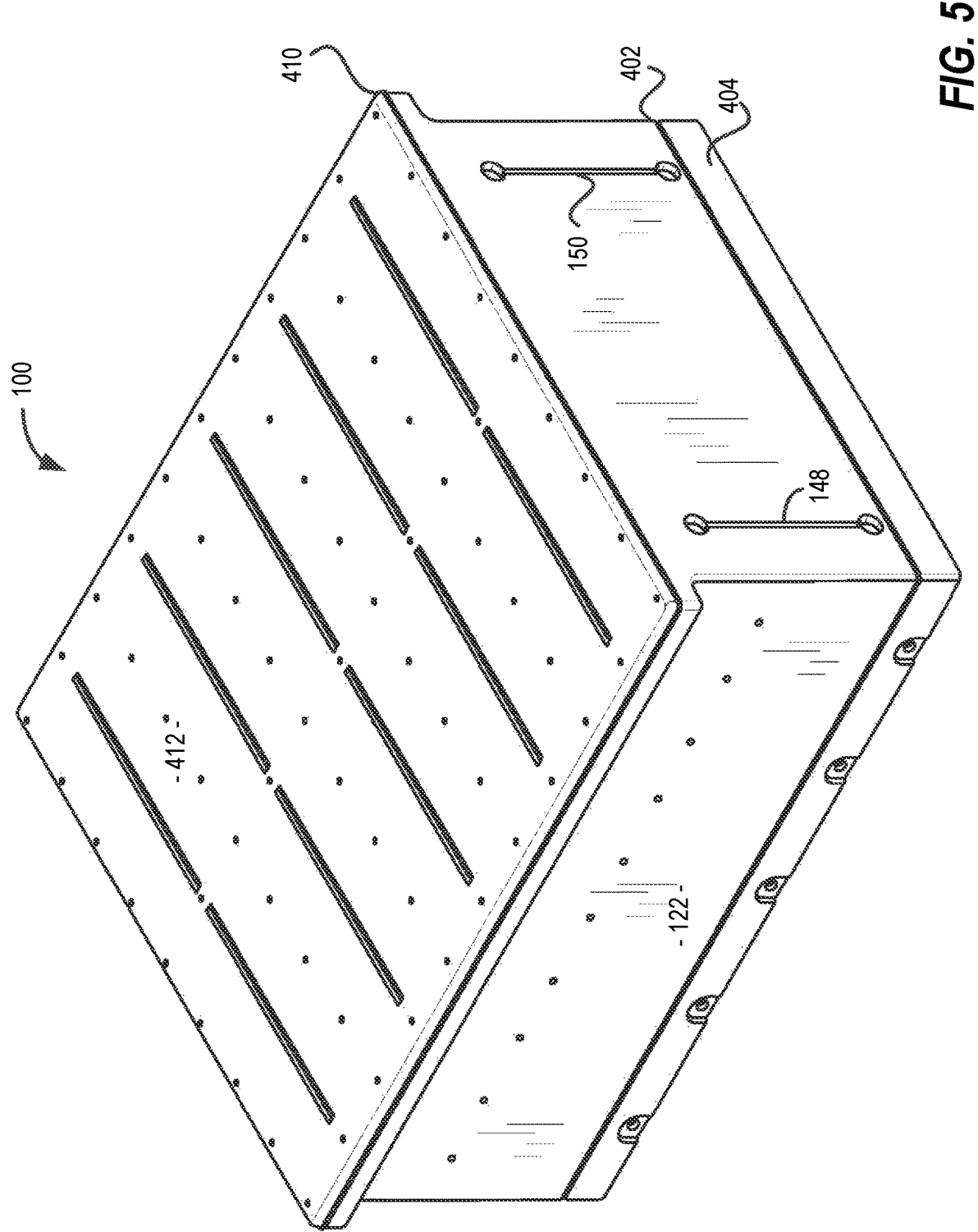
FIG. 5 shows the assembled air-metal battery, excluding positive and negative terminals.

FIG. 4 is an assembly view of housing 100 in complete form according to one embodiment. While it is possibly to integrally mold housing 100 to achieve a complete structure, it is also possible to achieve this by an assemblage of parts. Thus, a sidewall section 400, gasket 402 and bottom tray 404 may be suitably coupled into a watertight assembly by use of threaded fasteners 406, 408 to provide the housing 100 as described in FIG. 1. In this configuration, fuel card assemblies 200, 202 are placed within cells 102, 106, just as other fuel card assembly 300 are placed within their corresponding cells. A lid and corresponding gasket 410, 412 enclose the top and are attached by threaded fasteners 414, 416. The lid and gasket 410, 412 have vertically aligned slots 418 to assist with retention of fuel card assemblies 200, 202, and vertically aligned air holes 422 to provide for passage of oxygen and generated hydrogen gas according to the principles of electrochemical reaction enunciated above. FIG. 5 shows the completed assembly of housing 100 following the assembly according to FIG. 4.

As used herein, the term "air-metal battery" refers to a class of battery, and does not connote a requirement for the use of air. Air is useful because it contains oxygen which, as shown above, is useful in electrochemical reactions for this class of battery. Accordingly, it is not necessary to use air in the class of air-metal batteries where oxygen may be provided from a supplemental source. Also, even if there is no oxygen available, the half-cell reaction at the anode may proceed under appropriate conditions.

The foregoing discussion teaches by way of example and not by limitation. Thus, for example, the fuel card assemblies are shown as being rectilinear in shape, but other shapes may be provided including, concentric conical, or concentric tubular arrangements of the sheet members shown in FIG. 3.

Figure 6:
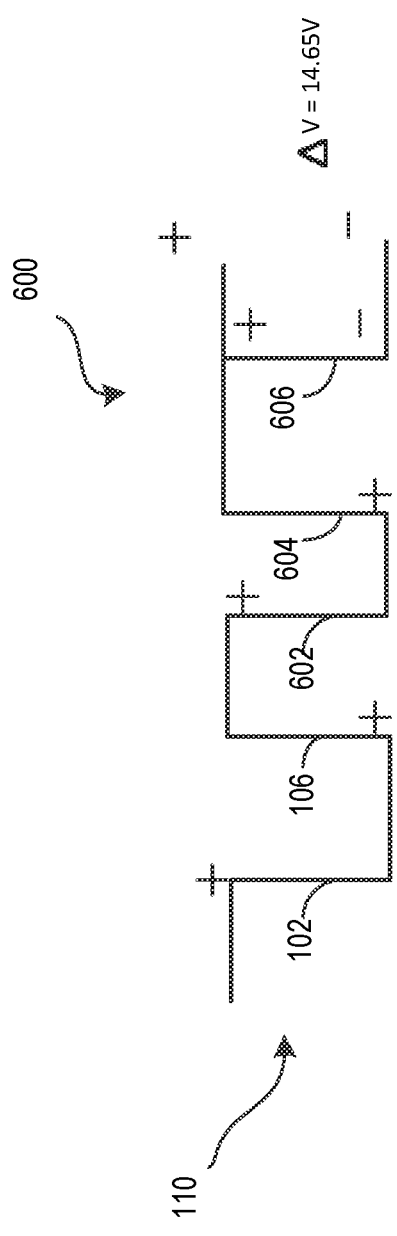
FIG. 6 is a wiring diagram that shows connecting the fuel cards in series.

FIG. 6 is a wiring diagram for housing 100 in which the fuel cards 200, 202, 602, 604, 606 of bank 110, are placed in series. This is done by placing the − terminal of a starting fuel card in communication with the + terminal of the fuel card then in turn, the − terminal of that fuel card is placed in communication with the + terminal of the next succeeding fuel card. In the case of a magnesium battery, this arrangement includes a voltage increase of 2.93 V for each fuel card, which amounts to a total increase of 14.65 V for bank 110. The fuel cards 200, 202, 602, 604, 606 may be constructed as exemplified by fuel card 300 per the teaching above.

Figure 7:
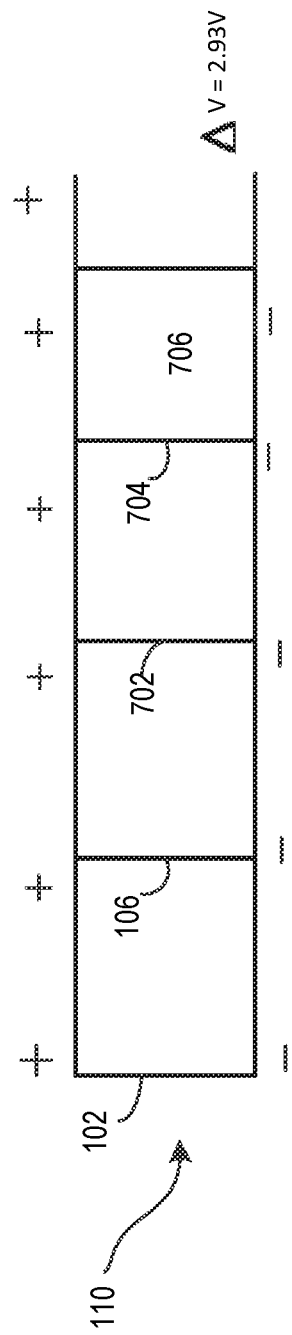
FIG. 7 is a wiring diagram that shows connecting the fuel cards in parallel.

FIG. 7 is a wiring diagram in which the fuel cards 200, 202, 702, 704, 706 of bank 110, are placed in parallel. This is done by placing the + terminals of all fuel cards in direct electrical communication, as is done also for the − terminals. In the case of a magnesium battery, this arrangement includes a voltage increase of 2.93 V across all fuel cards, which amounts to a total increase of 2.93 V for bank 110. The fuel cards 200, 202, 702, 704, 706 may be constructed as exemplified by fuel card 300 per the teaching above.

The foregoing discussion teaches by way of example and not by limitation. Thus, for example, the fuel card assemblies are shown as being rectilinear in shape, but other shapes may be provided including, concentric conical, or concentric tubular arrangements of the sheet members shown in FIG. 3. The fuel cards may be wired in other combinations, for example, by connecting also banks 110 and 112 in series for a total voltage increase of 29.3 V across ten cells inth4e case of a magnesium battery.

Those of ordinary skill in the art will understand that insubstantial changes may be made with respect to what is shown and described without departing from the scope and spirit of the invention. Therefore, the inventor intends to rely upon the Doctrine of Equivalents if needed to protect his full rights in what is claimed.

I claim:

1. An air-metal battery comprising:
 a housing that includes
  a bottom,
  a top with openings to permit egress of oxygen and exit of hydrogen, and
  partition walls coupled with the bottom to form an array of electrochemical cells that are chemically isolated from one another,
 an electrical rail system constructed as a gathering system for electrical current that is generated within each cell to place the array of electrochemical cells in series with respect to one another, thereby providing an increase of voltage from cell to cell within the array of electrochemical cells;
 a plurality of fuel card assemblies where
  each fuel card assembly is placed within a corresponding one of the electrochemical cells,
  each of the fuel card assemblies presents a cathode and an anode that contains an alkali metal for use as a fuel, and
  each fuel card assembly is assembled as a replaceable unit for renewal upon depletion of the alkali metal due to anodic reaction, and;
 electrical conductors operably constructed and arranged in each cell
  for feeding electricity generated by the respective fuel cards to the electrical rail system during the conduct of anodic and cathodic reactions, and for holding the fuel cards in static position during the conduct of cathodic and anodic reactions as the alkali metal is consumed;
 an electrically conductive fluid selected from the group consisting of at least one of a diol material, and a polyhydric material and which is made available for communicating electrons between the anode and the cathode.

2. The air-metal battery of claim 1, wherein the electrically conductive fluid is the diol material comprising at least 90% of the electrically conductive fluid by weight.

3. The air-metal battery of claim 2, wherein the diol material-consists essentially of-propylene glycol.

4. The air-metal battery of claim 1, wherein the fuel card assemblies each include a sandwich construction with remote sides of the alkali metal formed as a metal plate sandwiched by a pair of wicking pads and then a pair of cathodes.

5. The air-metal battery of claim 4, wherein the pair of cathodes are carbon-based.

6. The air-metal battery of claim 1, wherein the array is arranged in two banks of five cells each.

7. The air-metal battery of claim 1, wherein the alkali metal is primarily magnesium.

8. The air-metal battery of claim 1, in which the fuel card assemblies are available separately from the electrically conductive fluid to provide for a shelf-life of at least five years under conditions of no applied load.

* * * * *